(12) United States Patent
Cho et al.

(10) Patent No.: US 6,477,138 B1
(45) Date of Patent: Nov. 5, 2002

(54) DISC CARTRIDGE WITH GEARING SHUTTERS AND DISC DRIVER FOR DRIVING THE SAME

(75) Inventors: Won Hyoung Cho, Seoul (KR); Hong Soo Park, Seoul (KR); Jong Rak Lim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/299,881

(22) Filed: Apr. 27, 1999

(30) Foreign Application Priority Data

Apr. 28, 1998 (KR) ............................................. 98-15222
Apr. 28, 1998 (KR) ............................................. 98-15223

(51) Int. Cl.[7] ............................................ G11B 23/033
(52) U.S. Cl. ...................................................... 369/291
(58) Field of Search ................................. 369/289, 290, 369/291; 360/133

(56) References Cited

U.S. PATENT DOCUMENTS 243,355 A1 * 6/2001 Ikebe et al. .................. 369/291

* cited by examiner

Primary Examiner—Brian E. Miller
(74) Attorney, Agent, or Firm—Birch, Stewart, Kolasch & Birch, LLP

(57) ABSTRACT

A disc cartridge that is adapted to receive a small-size optical disc and is compatible with a large-size disc cartridge. In the disc cartridge, first and second shutters open and close an opening. A connector links the first shutters to the second shutters as any one of the first and second shutters is driven.

13 Claims, 22 Drawing Sheets

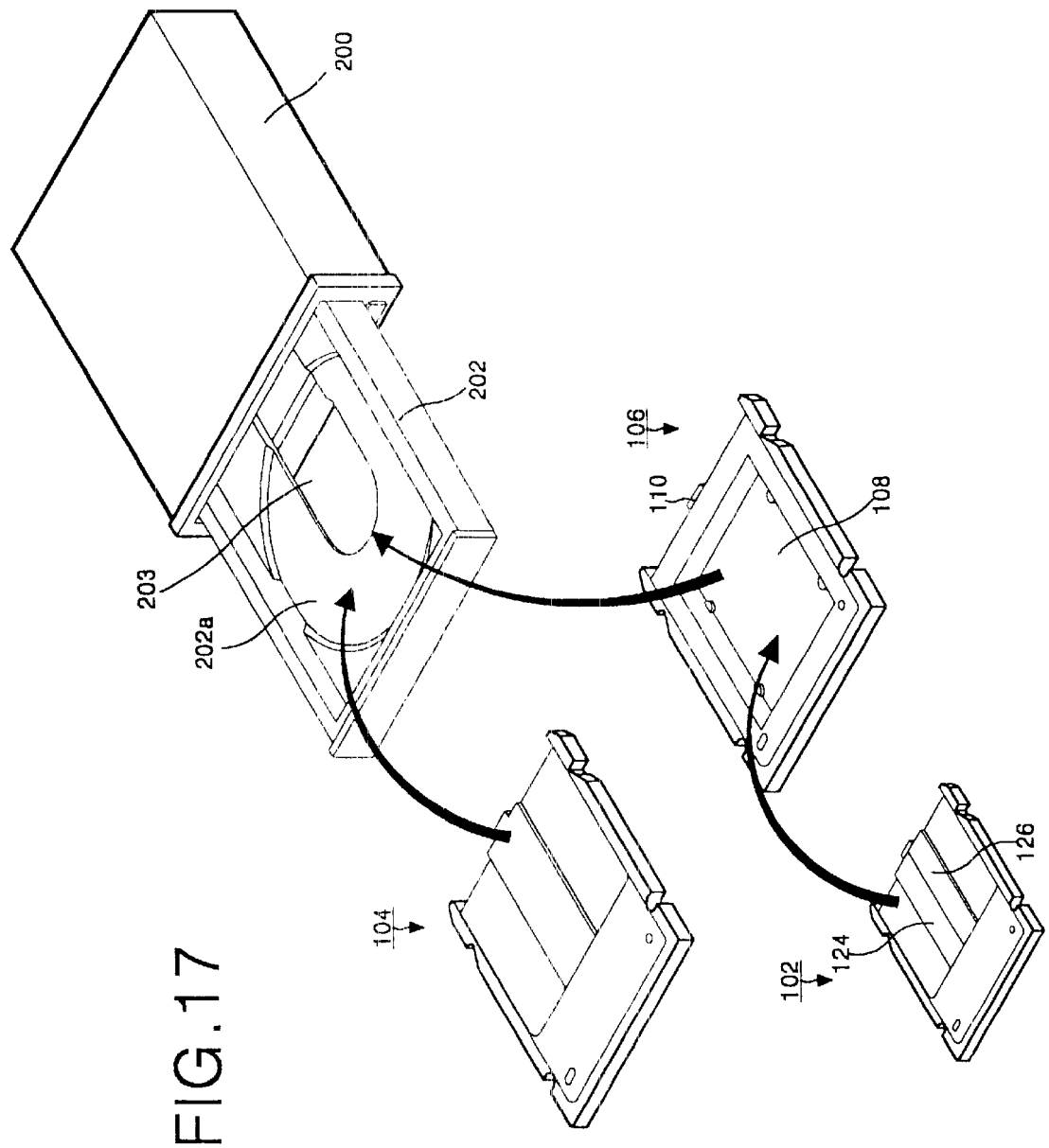

DISC CARTRIDGE WITH GEARING SHUTTERS AND DISC DRIVER FOR DRIVING THE SAME

BACKGROUND OF THE INVENTION

1. Field of the Invention

This invention relates to a disc cartridge within which a disc-type optical recording medium, hereinafter referred to as "optical disc", is received, and more particularly to a disc cartridge that is adaptive for receiving a small-size optical disc and is compatible with a large-size disc cartridge. Also, this invention is directed to a disc driver that is adapted to drive a different size of disc cartridges.

2. Description of the Prior Art

Generally, an optical disc is classified into a read-only type and a recordable type. The optical disc has been a tendency to a high density owing to a continuous study and development thereof. Such a high density of optical disc, particularly recordable-type optical disc requires a protection of the recording face from its contamination or damage in order to assure a recording stability. To this end, a recordable-type optical disc is usually available in a state received within a disc cartridge.

As shown in FIG. 1, the conventional disc cartridge includes a body 2 defined with an opening 6, and a shutter 4 for opening up the opening 6. An optical disc 1 with a diameter of 120 mm is rotatably received within the disc cartridge. The opening 6 is opened and closed by the shutter 4. The shutter 4 is linear-movably installed at the body 2. When the disc cartridge is loaded within a disc driver, the shutter 4 is linearly moved into the left or the right by means of a shutter opener installed within the disc driver to thereby open the opening 6. By an opening of the opening 6, the optical disc 1 is exposed to the exterior to be safely loaded on a turntable of a spindle motor and is clamped by a clamper. When the opening 6 is opened, an optical pickup irradiates a laser light through the opening 6 during the recording or the reproduction to thereby access the recording face or the reproducing face of the optical disc 1. A width of the opening 6 must be more than an opening width W in FIG. 1. This is intended to assure a clamping area of the optical disc 1 pressed with the spindle motor and the damper as well as to assure an access space of an optical pickup in such a manner that the optical pickup is freely carried in a radial direction of the optical disc 1. If the disc cartridge begins ejecting into the exterior in a state in which the opening 6 has been opened, the shutter opener returns to the original position thereof, thereby applying a restoring force of a spring, not shown, to the shutter 4. Then, the shutter 4 is carried into its original position by the restoring force of the spring to shut out the opening 6. The disc cartridge taken out into the exterior keeps a state in which the opening 6 is closed as long as an external force is applied to the shutter 4.

Generally, within the disc cartridge as shown in FIG. 1 is received an optical disc having a diameter of 120 mm. The optical disc with a diameter of 120 mm can record or reproduce a large capacity of data, but it has a drawback in that it is inconvenient to carry about it. The optical disc with a diameter of 120 mm and the disc cartridge are recorded or reproduced by means of a disc driver installed at a cradle information equipment such as a personal computer (PC). On the other hand, the optical disc with a diameter of 120 mm and the disc cartridge have a relatively large dimension, it is difficult to employ it to a small-size information equipment such as a digital camera, a camcoder and so on. As the optical disc has been a tendency to a high density, the optical disc is trending toward a small dimension so that it can be applied to the small-size information equipment. For example, an optical disc with a diameter of 80 mm is expected to be utilized as a recording medium of the camcoder, a recording medium of the digital camera or a recording medium of the portable computer. Such a small-size optical disc also is a tendency to be received within the disc cartridge so that it can be protected from a contamination or a damage thereof like the large-size optical disc. However, since the small-size disc cartridge has a reduced size of body 2 in comparison to the large-size disc cartridge enough to reduce a carried amount of the shutter 4, it is difficult for the opening 6 to assure a sufficient opening width W.

A scheme of reducing a width of the opening may be considered in view of such a problem, but the clamping space and the accessing space are reduced to that extent. If the clamping space and the accessing space are reduced, then it can not help reducing the sizes of the optical pickup, the damper and the turntable of the spindle motor installed within the disc driver driving the existent large-size optical disc. Moreover, because a clamping force exerting on the optical disc is reduced as a reduced clamping size is reduced in this case, the optical disc is liable to be influenced by a vibration. To compensate such a vibration is attended with much technical difficulties such as a more accurate servo control. As a result, it can be seen that the scheme of reducing a size of the opening 6 require an individual disc driver suitable for the small-size disc cartridge because it is not available to a disc driver loaded with the large-size disc cartridge.

Alternatively, a scheme disclosed in Japanese Patent Laid-open Gazette No. Puyng 8-180636 is to permit a single disc driver to drive a different size of cartridges by utilizing an adapter. However, it is useless to employ the adapter because, if the size of opening is different, the optical pickup, the spindle motor and the clamper, etc. must have different sizes.

Therefore, it is necessary to provide a new scheme of permitting the small-size disc(or the small-size disc cartridge) and the large-size disc(or the large-size disc cartridge) to be driven with a single disc driver.

SUMMARY OF THE INVENTION

Accordingly, it is an object of the present invention to provide a disc cartridge with a gearing shutter that is compatible with a large-size disc cartridge.

Further object of the present invention is to provide a disc driver that is adapted to drive both a small disc cartridge and a large-size disc cartridge.

In order to achieve these and other objects of the invention, a disc cartridge with gearing shutters according to one aspect of the present invention includes first and second shutter members for opening and closing the opening; and connecting means for linking the first and second shutter members as any one of the first and second shutter members is driven.

A disc driving apparatus according to another aspect of the present invention includes receiving means for receiving a small-size disc cartridge within which a small-size optical disc is received and in which, when any one of the first and second shutter members is driven, the other shutter member is linked; and driving means for driving the small-size disc cartridge.

BRIEF DESCRIPTION OF THE DRAWINGS

These and other objects of the invention will be apparent from the following detailed description of the embodiments of the present invention with reference to the accompanying drawings, in which:

FIG. 17 is a view showing the configuration of a disc driver according to an embodiment of the present invention.

DETAILED DESCRIPTION OF THE PREFERRED EMBODIMENT

Figure 2:
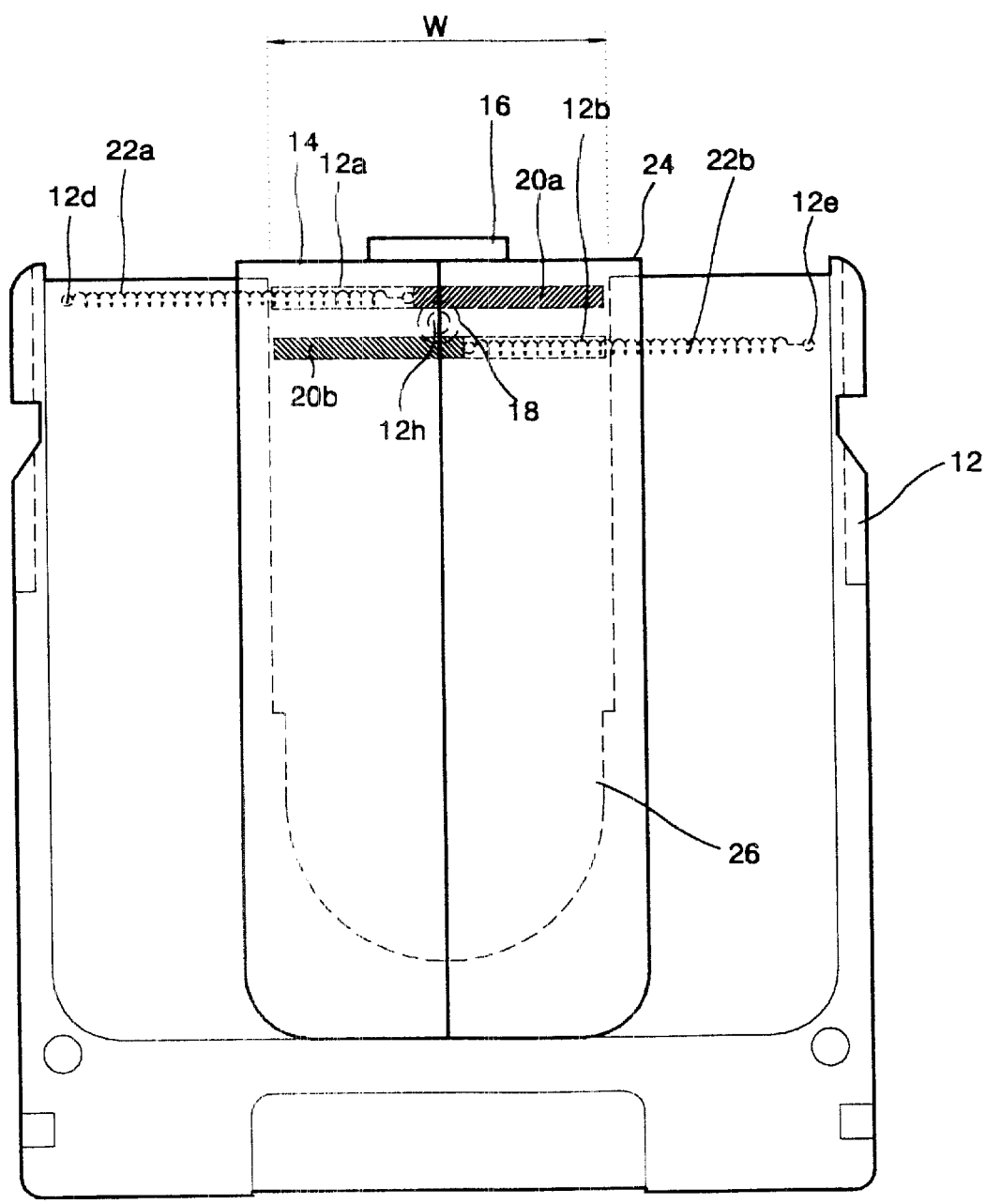
FIG. 2 is a view showing the configuration of a disc cartridge with a gearing shutter according to the first embodiment of the present invention.

Referring to FIG. 2, there is shown a disc cartridge according to the first embodiment of the present invention. The disc cartridge includes a body 12 defined with an opening 26, first and second shutters 14 and 24 installed linear-movably at the body 12, and a shutter driver for moving the first and second shutters 14 and 24 simultaneously in an opposite direction. A width of the opening 26 defined at the body 12 is equal to that of the large-disc cartridge. The first and second shutters 14 and 24 is driven with the shutter driver to be linearly moved in a direction opposite to each other, thereby opening and closing the opening 26.

Figure 3:
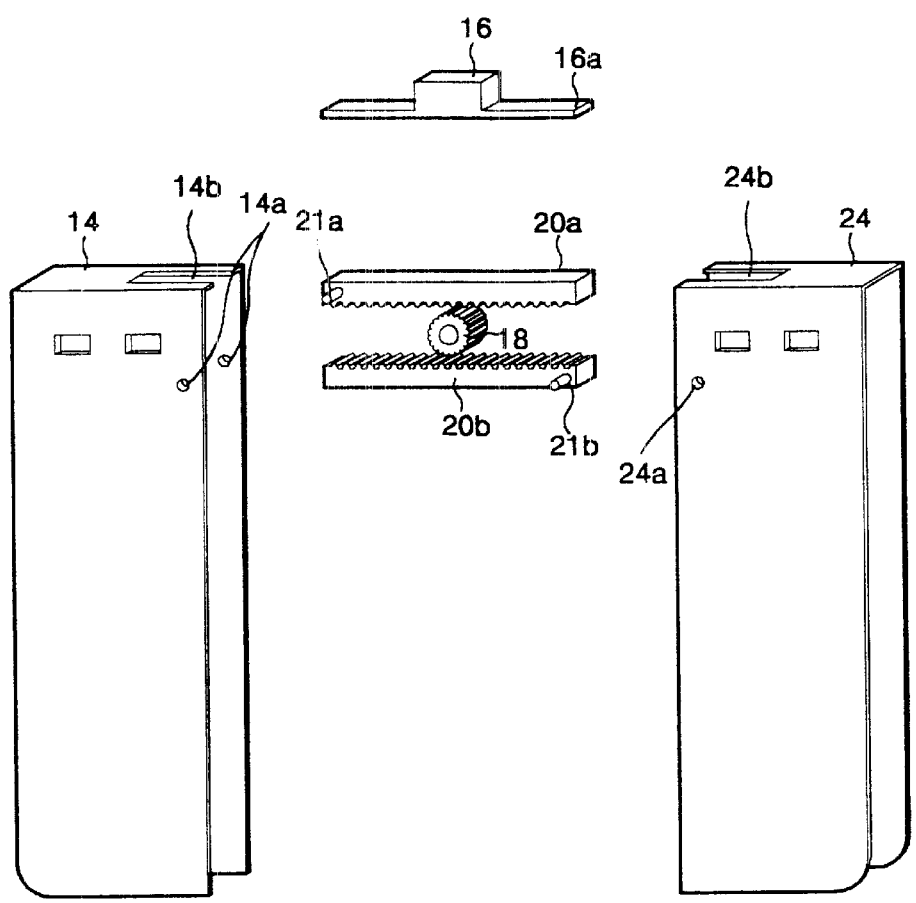
FIG. 3 is an exploded perceptive view of the disc cartridge shown in FIG. 3.
Figure 4:
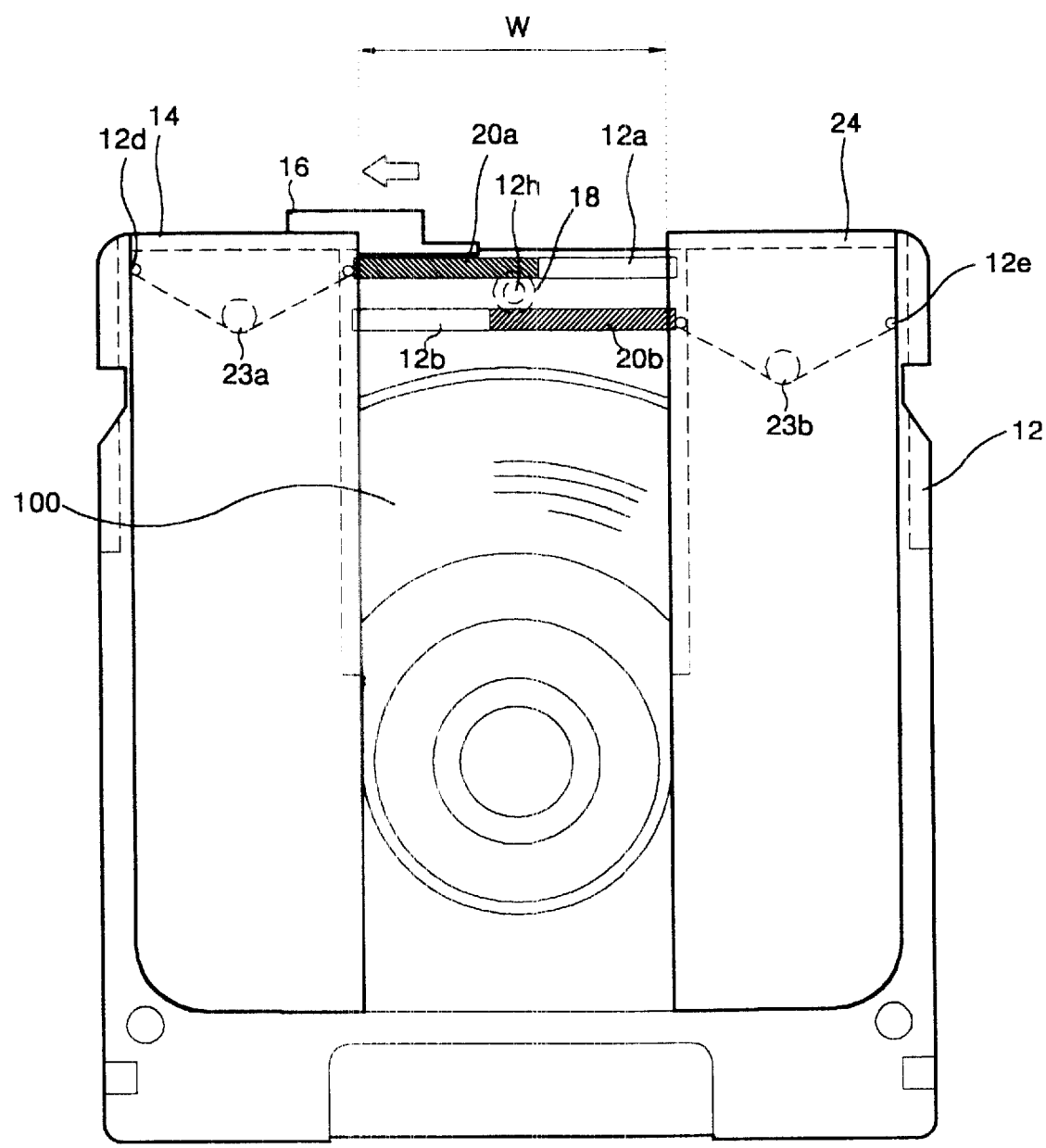
FIG. 4 is a plan view of an elastic member for applying a restoring force to the shutter shown in FIG. 2.

Referring now to FIG. 2 and FIG. 3, the shutter driver includes a pinion 18 rotatably installed at the body 12, first and second linear racks 20a and 20b coupled with any one of the first and second shutters 14 and 24, first and second tension springs 22a and 22b for applying a restoring force to the first and second linear racks 20a and 20b, and a shutter head 16 for transferring to any one of the first and second shutters 14 and 24. The pinion 18 is rotatably engaged with a hinge hole 12h defined at the upper center portion within the body 12. The pinion 18 is toothed into the first and second linear racks 20a and 20b in such a manner to be opposed around the hinge hole 12h. When the pinion 18 is rotated, the first and second linear racks 20a and 20b are moved in a direction contrary to each other. The first linear rack 20a is toothed into the pinion 18 and, at the same time, a pin 21a installed at the end thereof is inserted into a hole 14a defined at one side of the first shutter 14, thereby being coupled with the first shutter 14. Likewise, the second linear rack 20b is toothed into the pinion 18 and, at the same time, a pin 21b formed at the end thereof is inserted into a hole 24a defined at the one edge of the upper side of the second shutter 24, thereby being coupled with the second shutter 24. The first and second linear racks 20a and 20b is linear-movably inserted into first and second guide holes 12a and 12b formed, in parallel, at the upper side of the body 12, respectively. The first and second linear racks 20a and 20b are prepared into a length approximately equal to a width of one shutter. The first and second linear racks 20a and 20b is linked to any one of the first and second shutters 14 and 24 to be moved linearly to thereby rotate the pinion 18 in a clockwise or counterclockwise direction, and converts the rotational motion of the pinion 18 into a linear motion to transfer it to other side shutter 24 or 14. One sides of the first and second tension springs 22a and 22b are secured to spring locking protrusions 12d and 12e defined at the upper left and right ends within the body 12 while other sides thereof are secured to the ends of the linear racks 20a and 20b. The first and second tension springs 22a and 22b are compressed by the first and second shutters 14 and 24 when the opening 26 is opened, whereas they moves the first and second shutters 14 and 24 into the opening 26 by their restoring forces when the opening 26 is closed. The tension springs 22a and 22b can be replaced with coil springs 23a and 23b as shown in FIG. 4. Alternatively, they may be replaced with any tension members capable of applying a tensile restoring force. An arm 16a extended in parallel is provided at the bottom surface of the shutter head 16. The shutter head 16 is inserted into the shutter guide holes 14b and 24b defined at the upper walls the first and second shutters 14 and 24, respectively. The arm 16a is opposed to the bottom surfaces of the upper walls of the first and second shutters 14 and 24 to prevent the shutter head 16 from being seceded from the first shutter 14 or the second shutter 24. The shutter head 16 is driven with the shutter opener when the disc cartridge is loaded within the disc drive to move any one of the first and second shutters 14 and 24.

An optical disc 100 received within Such a disc cartridge is an optical disc with a small dimension (e.g., a diameter of 80 mm), and which can become to a read-only type or a recordable type depending on whether it has a recording capability. Also, the optical disc 100 may have a single or double recording face depending on the number of recording face.

Meanwhile, the shutters of the loaded disc cartridge may have a different opened direction depending on the disc driver. This will be described below with reference to FIG. 5A and FIG. 5B.

Figure 5A:
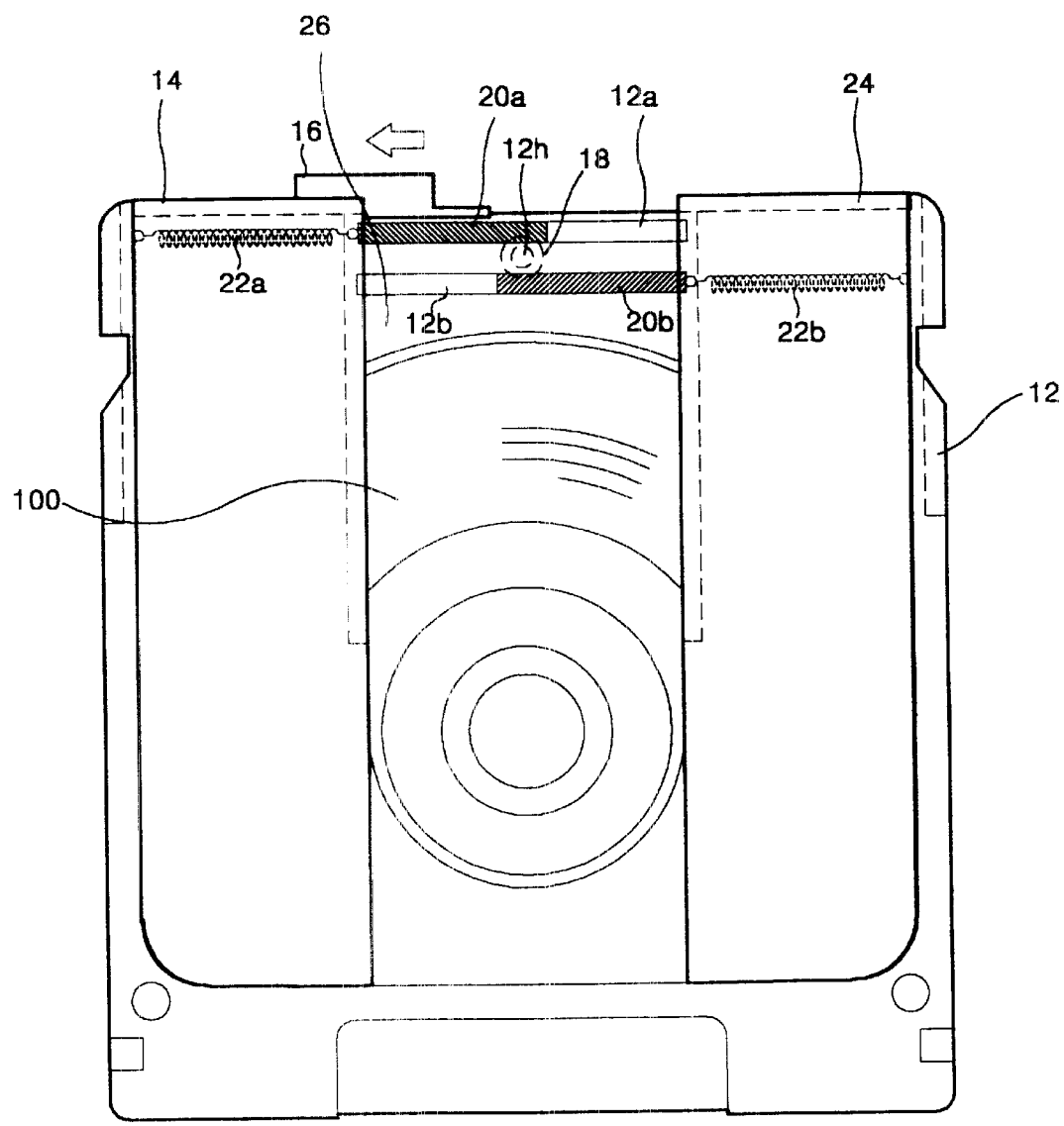
FIG. 5A is a view for representing an operation when the disc cartridge in FIG. 2 undergoes a driving force into the left.

Referring to FIG. 5A, if a disc cartridge according to the present invention is loaded into a disc driver opening the shutters to the left, then the shutter head 16 undergoes a force to the left by the shutter opener installed within the disc driver. Then, the shutter head 16 and the first shutter 14 is linked to the shutter opener to be moved into the left. At the same time, the first linear rack 20a is linked to the first shutter 14 to be linearly moved to the left while the pinion 18 is linked to the first linear rack 20a to be counterclockwise rotated. The second linear rack 20b is linked to the pinion 18 to be linearly moved to the right while the second shutter 24 is moved into the right along the second linear rack 20b. As a result, the shutter head 16 and the first shutter 14 are moved to the left and, simultaneously, the second shutter 24 is moved to the right. When the first and second shutters 14 and 24 are stuck fast to the side wall of the body 12, the opening 26 is completely opened.

Figure 5B:
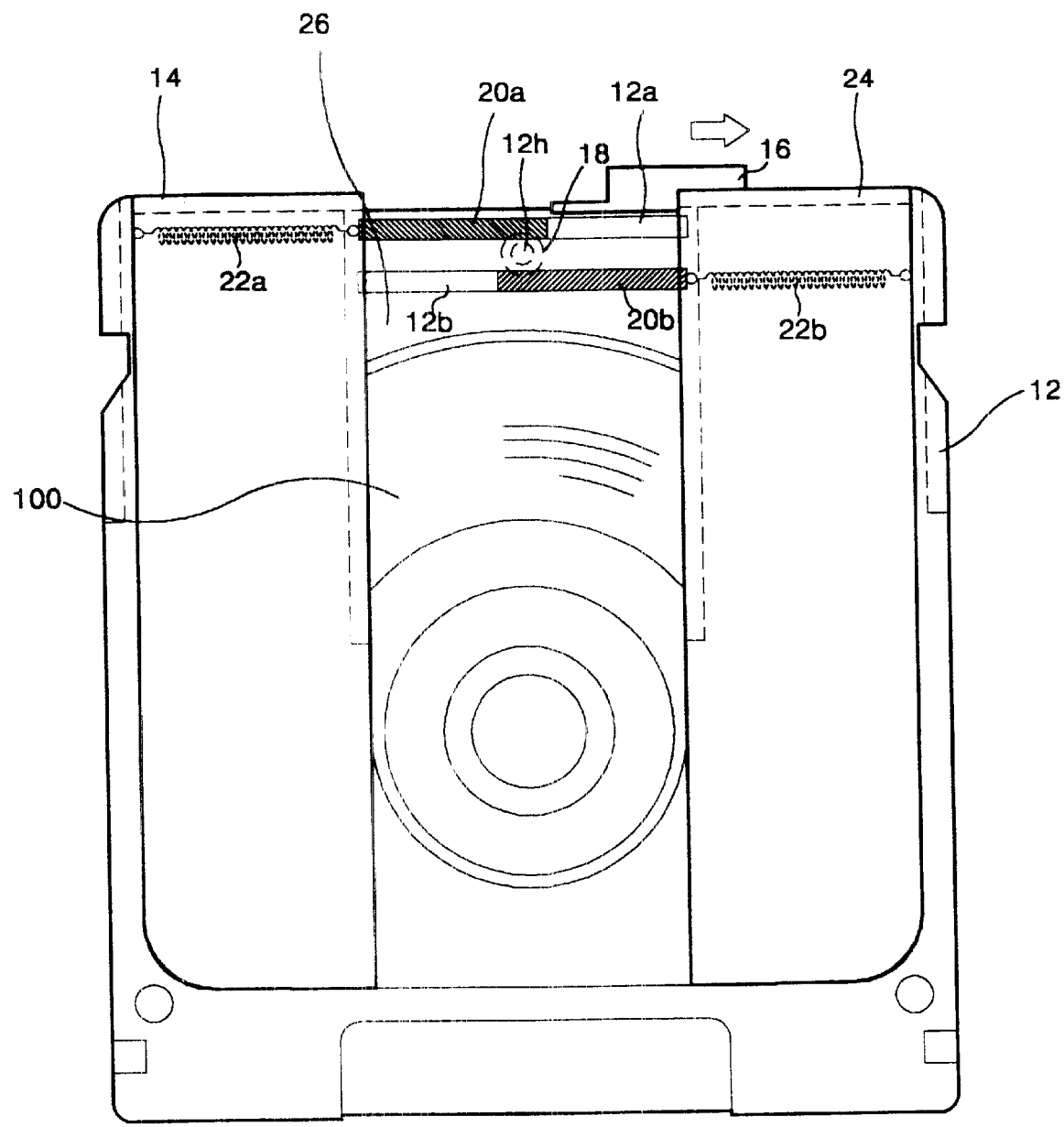
FIG. 5B is a view for representing an operation when the disc cartridge in FIG. 2 undergoes a driving force into the right.

Referring now to FIG. 5B, if the disc cartridge according to the present invention is loaded into the disc driver opening the shutter to the right, then the shutter head 16 undergoes a force to the right by the shutter opener installed within the disc driver. Then, the shutter head 16 and the second shutter 24 is linked to the shutter opener to be moved into the right. At the same time, the second linear rack 20b is linked to the second shutter 24 to be linearly moved to the right while the pinion 18 is linked to the second linear rack 20b to be clockwise rotated. The first linear rack 20a is linked to the pinion 18 to be linearly moved to the left while the first shutter 14 is moved into the left along the first linear rack 20a. As a result, if the shutter head 16 undergoes a force to the right in the same manner that the shutter head 16 undergoes a force to the left, then the first and second shutters 14 and 24 is moved in a direction contrary to each other to open the opening 26.

Figure 6:
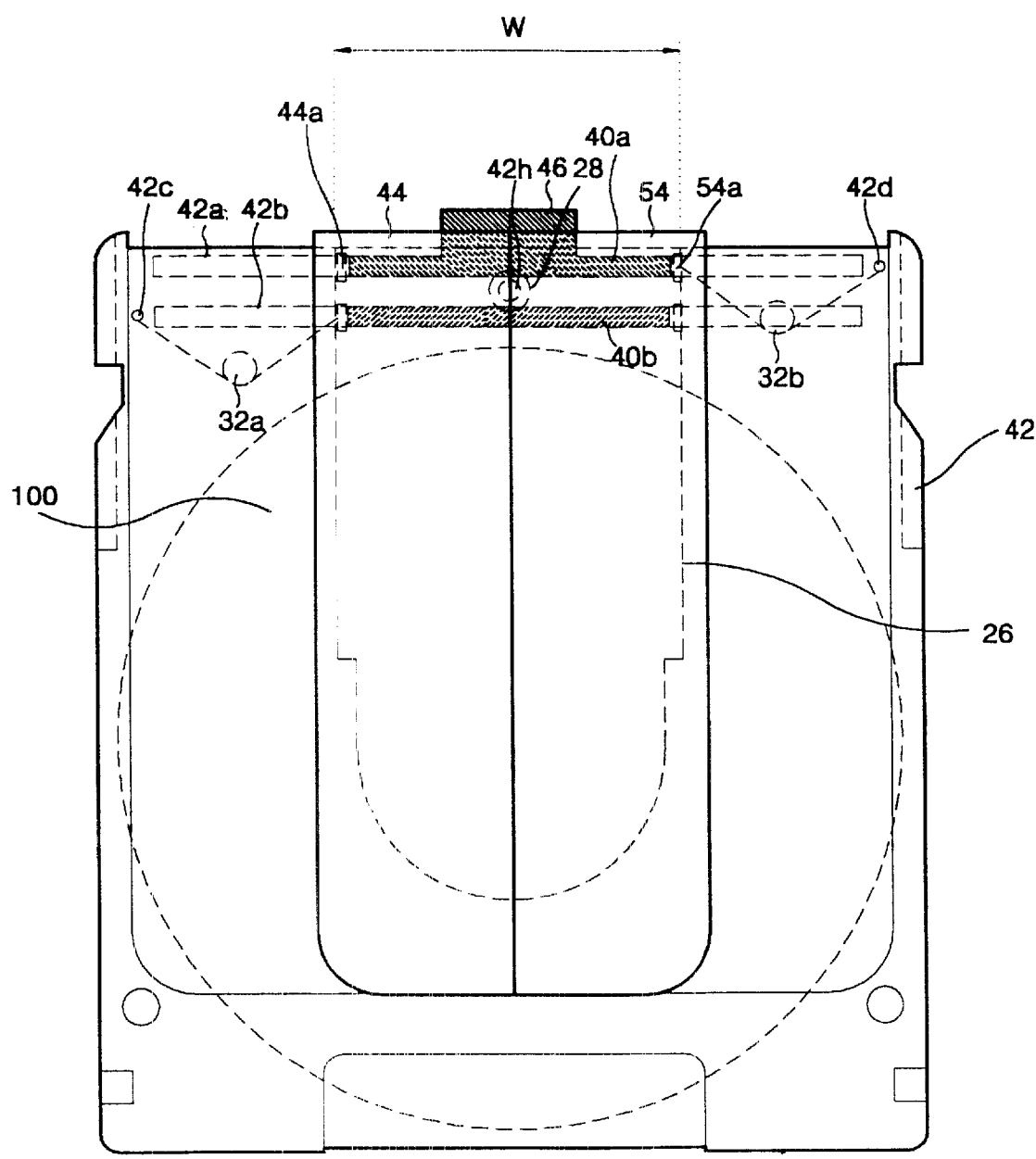
FIG. 6 is a view showing the configuration of a disc cartridge with a gearing shutter according to the second embodiment of the present invention.

Referring to FIG. 6, there is shown a disc cartridge according to the second embodiment of the present invention. The disc cartridge includes a body 42 defined with an opening 26, first and second shutters 44 and 54 installed linear-movably at the body 42, and a shutter driver for moving the first and second shutters 44 and 54 simultaneously in an opposite direction. A small-size optical disc 100 is rotatably received within the body 42. The opening 26 defined at the body 42 has an opening width W equal to that of the large-disc cartridge. The first and second shutters 44 and 54 are driven with the shutter driver to be linearly moved in a direction opposite to each other, thereby opening and closing the opening 26. The first linear rack 40a is integral to the shutter head 46.

Figure 7:
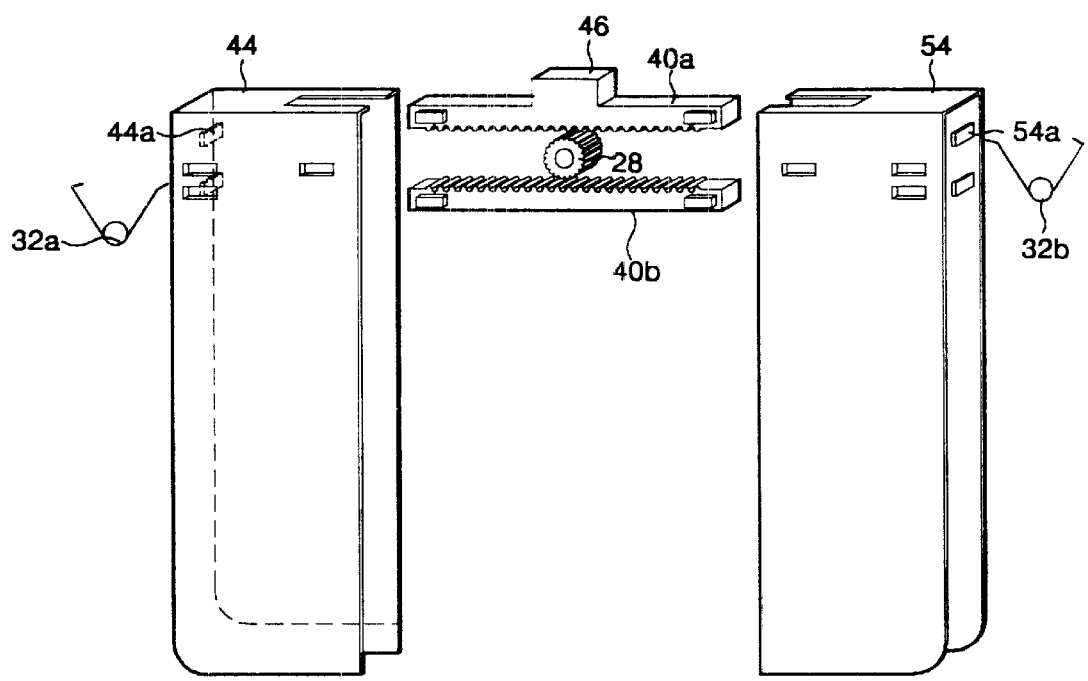
FIG. 7 is an exploded perspective view of the shutter and the shutter driver shown in FIG. 6.
Figure 8:
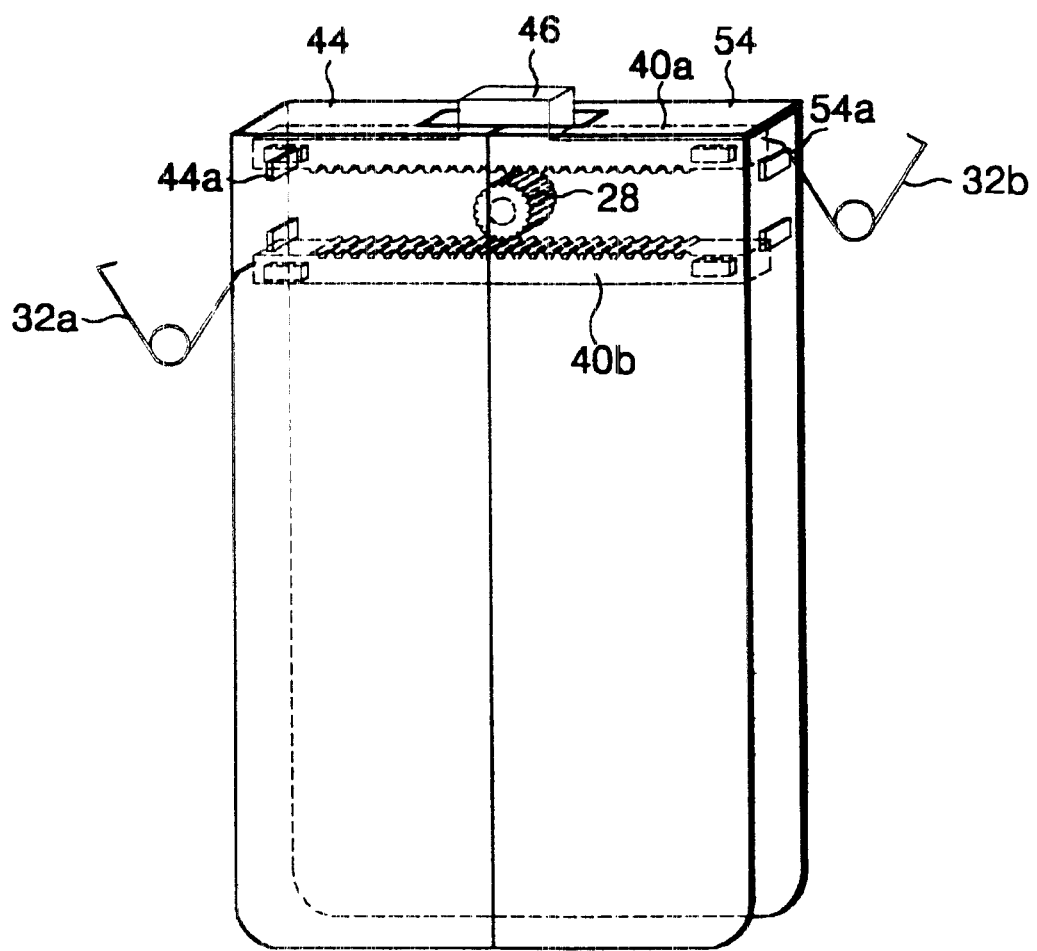
FIG. 8 is a perspective view of the shutter and the shutter driver shown in FIG. 6.

Referring now to FIG. 7 and FIG. 8, the shutter driver includes a pinion 28 rotatably installed at the body 42, first and second linear racks 40a and 40b toothed into the pinion 28 and, at the same time, coupled with any one of the first and second shutters 44 and 54, and first and second coil springs 32a and 32b for applying a restoring force to the first and second linear racks 40a and 40b. The pinion 28 is rotatably engaged with a hinge hole 42h defined at the upper center portion within the body 42.

The pinion 28 is toothed into the first and second linear racks 40a and 40b in such a manner to be opposed around the hinge hole 42h. When the pinion 28 is rotated, the first and second linear racks 40a and 40b are moved in a direction contrary to each other. The first and second linear racks 40a and 40b are linear-movably inserted into first and second guide holes 42a and 42b formed, in parallel, at the upper side of the body 42, respectively. The first and second guide holes 42a and 42b are prepared into a length equal to twice the shutter width, that is, a length corresponding to the width of the first and second shutters 44 and 54. The first and second linear racks 40a and 40b contacts stoppers 44a and 54a defined at the first and second shutters 44 and 54 when it is linearly moved to thereby push the first and second shutters 44 and 54 in a direction contrary to each other. The first and second linear racks 40a and 40b are linked to any one of the first and second shutters 44 and 54 to be moved linearly to thereby rotate the pinion 28 in a clockwise or counterclockwise direction, and converts the rotational motion of the pinion 28 into a linear motion and transfers it to other side shutter 54 or 44. One sides of the first and second coil springs 32a and 32b are secured to spring locking protrusions 42c and 42d defined at the upper left and right ends within the body 42 while other sides thereof are secured to the ends of the linear racks 40a and 40b or the stoppers 44a and 54a. The first and second coil springs 32a and 32b are compressed by the first and second shutters 44 and 54 when the opening 26 is opened, whereas they moves the first and second shutters 44 and 54 into the opening 26 by their restoring forces when the opening 26 is closed. When compared with the disc cartridge shown in FIG. 2, the disc cartridge shown in FIG. 6 has lengths of the first and second shutters 44 and 54 which is equal to approximately twice the length thereof in the disc cartridge shown in FIG. 2. Accordingly, when the shutters have been closed, the shutters 14 and 24 in the disc cartridge shown in FIG. 2 have the ends toothed into the pinion 18; otherwise, the first and second shutters 44 and 54 in the disc cartridge shown in FIG. 6 are symmetrically toothed while positioning the pinion 28 therebetween at the center in the longitudinal direction thereof. Also, the disc cartridge shown in FIG. 2 has the shutter head 26 installed separately from the first and second shutters 14 and 24, whereas the disc cartridge shown in FIG. 5 is integral to the first linear rack 40a.

The operations of the shutters 44 and 54 and the driver thereof will be described below in relation to FIG. 9A and FIG. 9B.

Figure 9A:
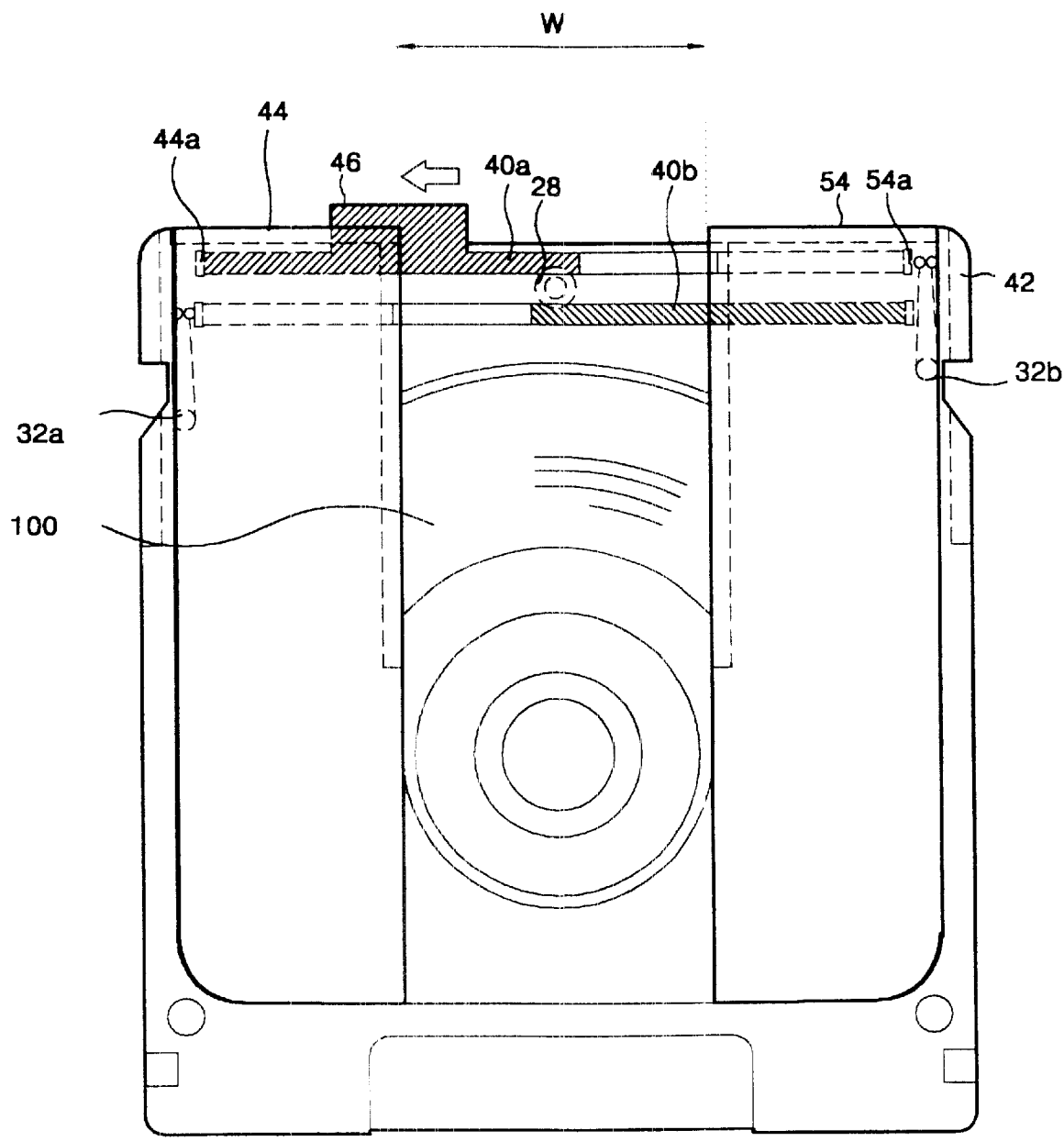
FIG. 9A is a view for representing an operation when the disc cartridge in FIG. 6 undergoes a driving force into the left.

Referring to FIG. 9A, if a disc cartridge according to the present invention is loaded into a disc driver opening the shutters to the left, then the shutter head 46 and the first linear rack 40a undergo a force to the left by the shutter opener installed within the disc driver. Then, the first shutter 44 is moved into the left along the first linear rack 40a. At the same time, the pinion 28 is linked to the first linear rack 40a to be rotated counterclockwise while the second linear rack 40b is linked to the pinion 28 to be linearly moved to the right. As a result, the first shutter 44 is moved to the left and, at the same time, the second shutter 54 is moved to the right. When the first and second shutters 44 and 54 are stuck fast to the side wall of the body 42, the opening 26 is completely opened.

Figure 9B:
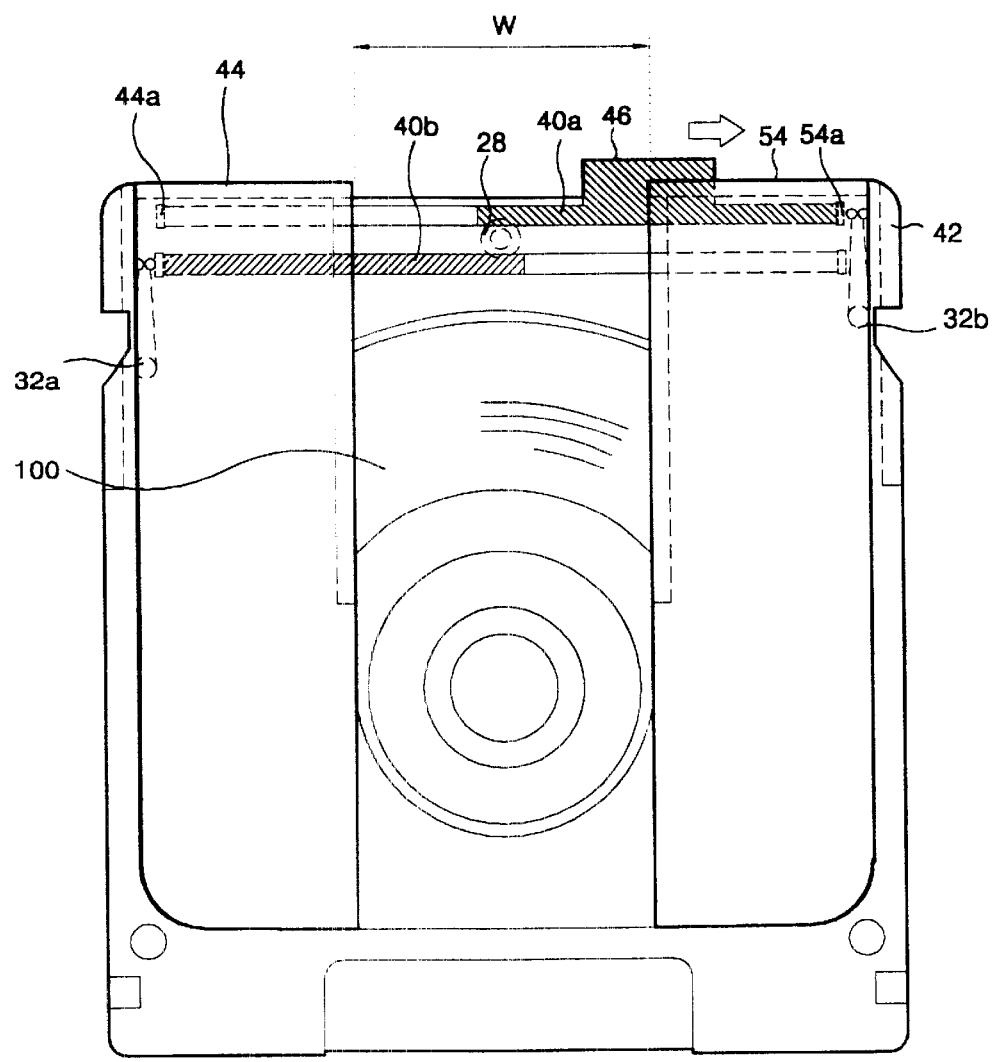
FIG. 9B is a view for representing an operation when the disc cartridge in FIG. 6 undergoes a driving force into the right.

Referring now to FIG. 9B, if the disc cartridge according to the present invention is loaded into the disc driver opening the shutter to the left, then the shutter head 46 and the first linear rack 40a undergo a force to the left by the shutter opener installed within the disc driver. Then, the second shutter 54 is moved to the right along the first linear rack 40*a*. At the same time, the pinion 28 is linked to the first linear rack 40*a* to be counterclockwise rotated, and the second linear rack 40*b* is linked to the pinion 28 to be linearly moved to the left. As a result, the first shutter 44 is moved into the left and, at the same time, the second shutter 54 is moved into the right.

Figure 10:
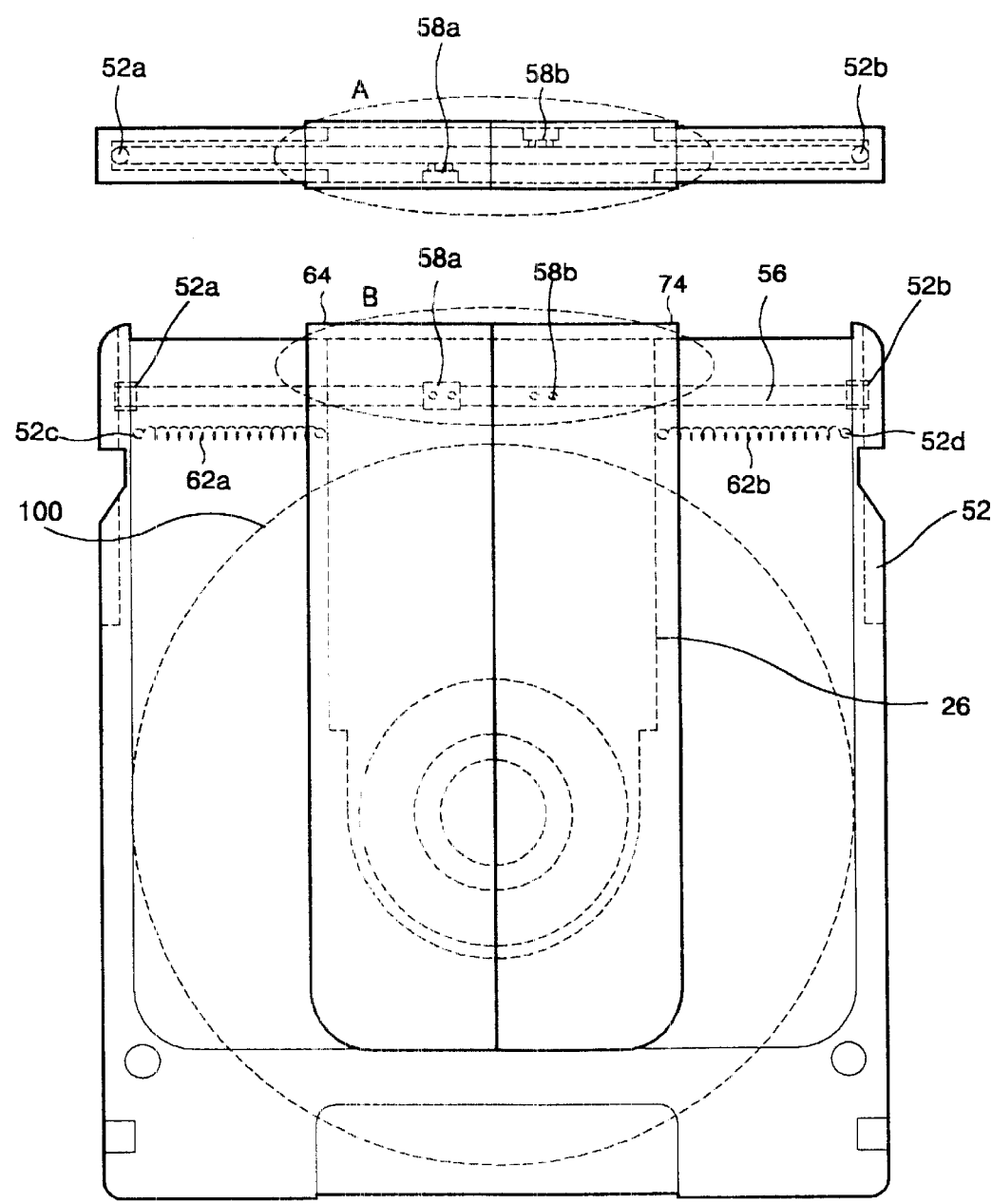
FIG. 10 is a view showing the configuration of a disc cartridge with a gearing shutter according to the third embodiment of the present invention.
Figure 11A:
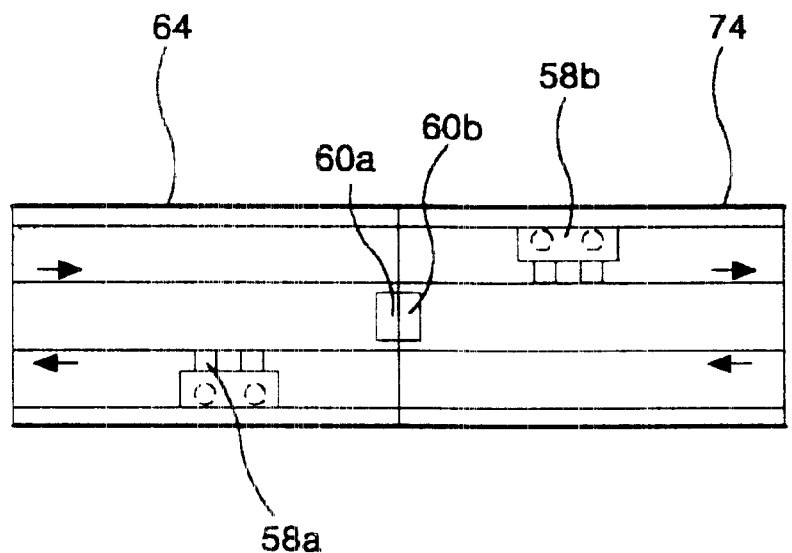
FIG. 11A is an enlarged view of "A" portion in FIG. 10.
Figure 11B:
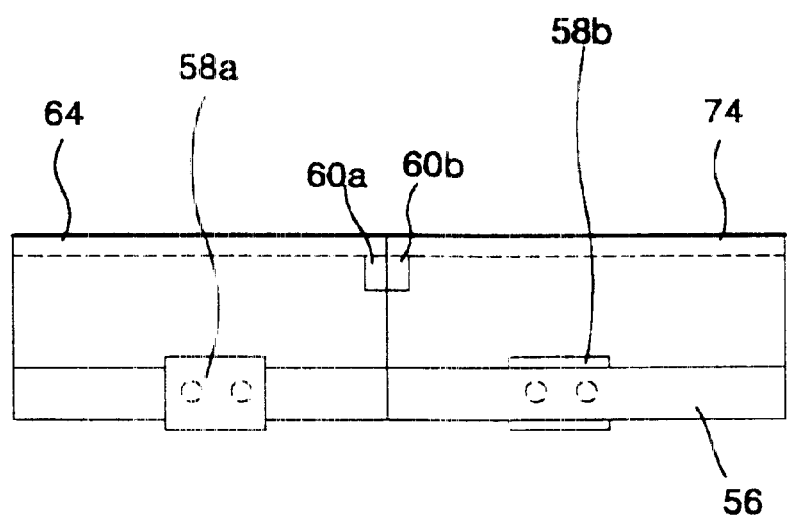
FIG. 11B is an enlarged view of "B" portion in FIG. 10.

Referring to FIG. 10, there is shown a disc cartridge according to the third embodiment of the present invention. The disc cartridge includes a body 52 defined with an opening 26, first and second shutters 64 and 74 installed linear-movably at the body 52, a belt 56 for linearly driving the first and second shutters 64 and 74 in a direction contrary to each other, and first and second tension springs 62*a* and 62*b* for applying a restoring force to the first and second shutters 64 and 74. A small-size optical disc 100 is rotatably received within the body 52. The opening 26 defined at the body 52 has an opening width W equal to that of the large-disc cartridge. The first and second shutters 64 and 74 have protruded stoppers 60*a* and 60*b* defined at the adjoined side thereof in such a manner to be not overlapped with respect to each other. If the first and second shutters 64 and 74 have a thickness more than a predetermined value, then they are not overlapped so that stoppers 60*a* and 60*b* can be omitted. The first shutter 64 is connected to the belt 56 by means of a first belt connector 58*a* while the second shutter 74 is connected to the belt 56 by means of a second belt connector 58*b*. In this case, the first shutter 64 and the second shutter 74 are symmetrically connected to the front and rear surface thereof around the belt 56. The belt 56 is formed in a stripe type such as a flexible film having a constant area. Alternatively, the belt 56 may use a string type or a wire type, but it is desirable that the belt 56 use the stripe type for the sake of simplifying the mechanical assembly. The belt 56 is engaged with rollers 52*a* and 52*b* defined at the body 52 in a shape of endless track. When such a belt 56 suffers a rotation force by any one shutter 64 or 74, it moves other shutter 74 or 64 in an opposite direction thereof. The first and second tension springs 62*a* and 62*b* have one sides secured to spring locking protrusions 52*c* and 52*d* defined at the upper left and right ends within the body 52, respectively, and other sides secured to the first and second shutters 64 and 74, respectively.

Figure 12A:
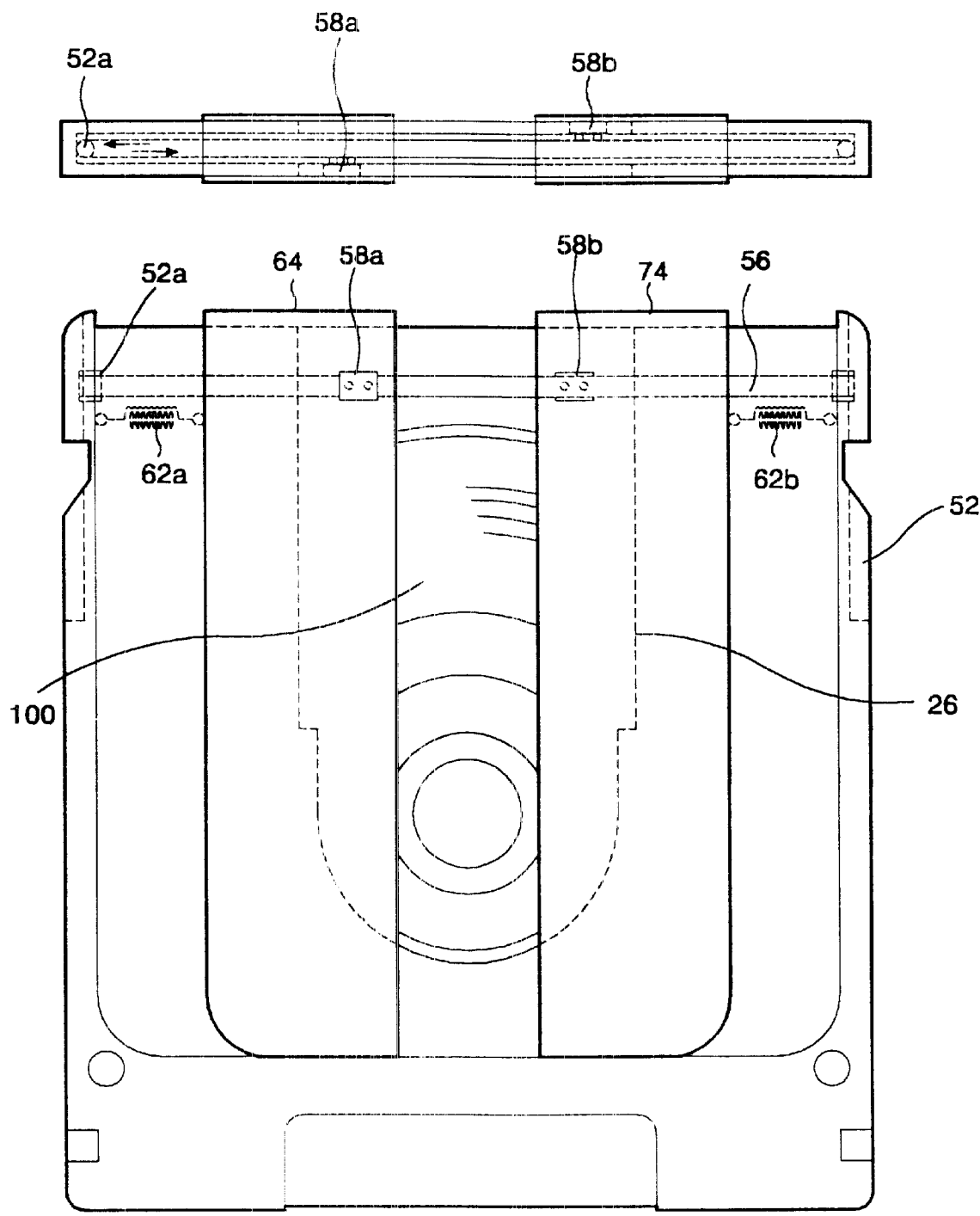
FIG. 12A is a view for representing an initial operation when the disc cartridge in FIG. 10 undergoes a driving force.
Figure 12B:
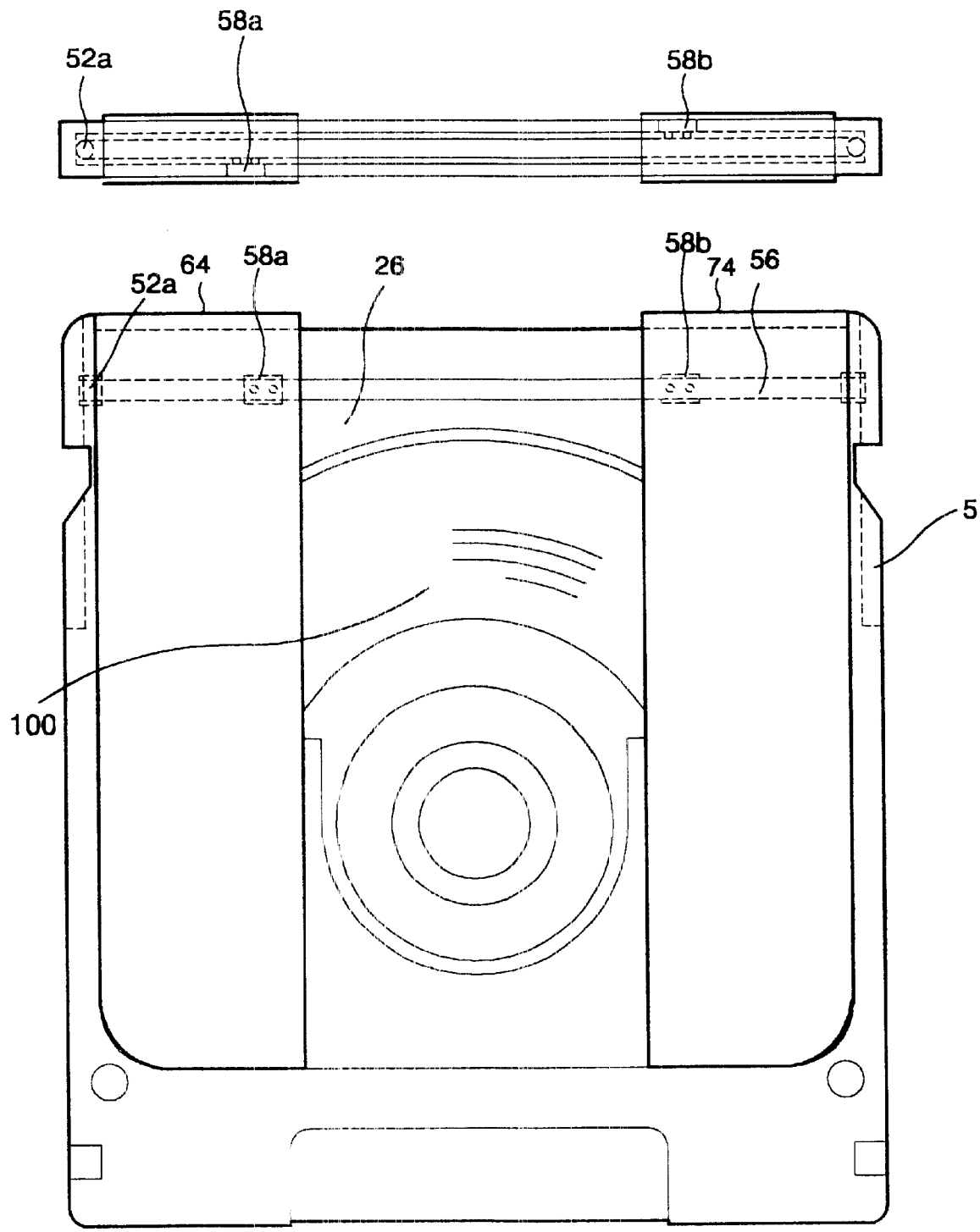
FIG. 12B is a view for representing a state in which the disc cartridge in FIG. 10 undergoes a driving force to open the opening.

Referring to FIG. 12A and FIG. 12B, when a force is applied to any one of the first and second shutters 64 and 74 in the disc cartridge shown in FIG. 10, the belt 56 is rotated. At the same time, the shutter 74 or 64 which does not undergo a force is linked to the belt 56 to be linearly moved in a direction contrary to the linear motion direction of the shutter 64 or 74 which undergoes a force, thereby opening the opening 26.

Figure 13:
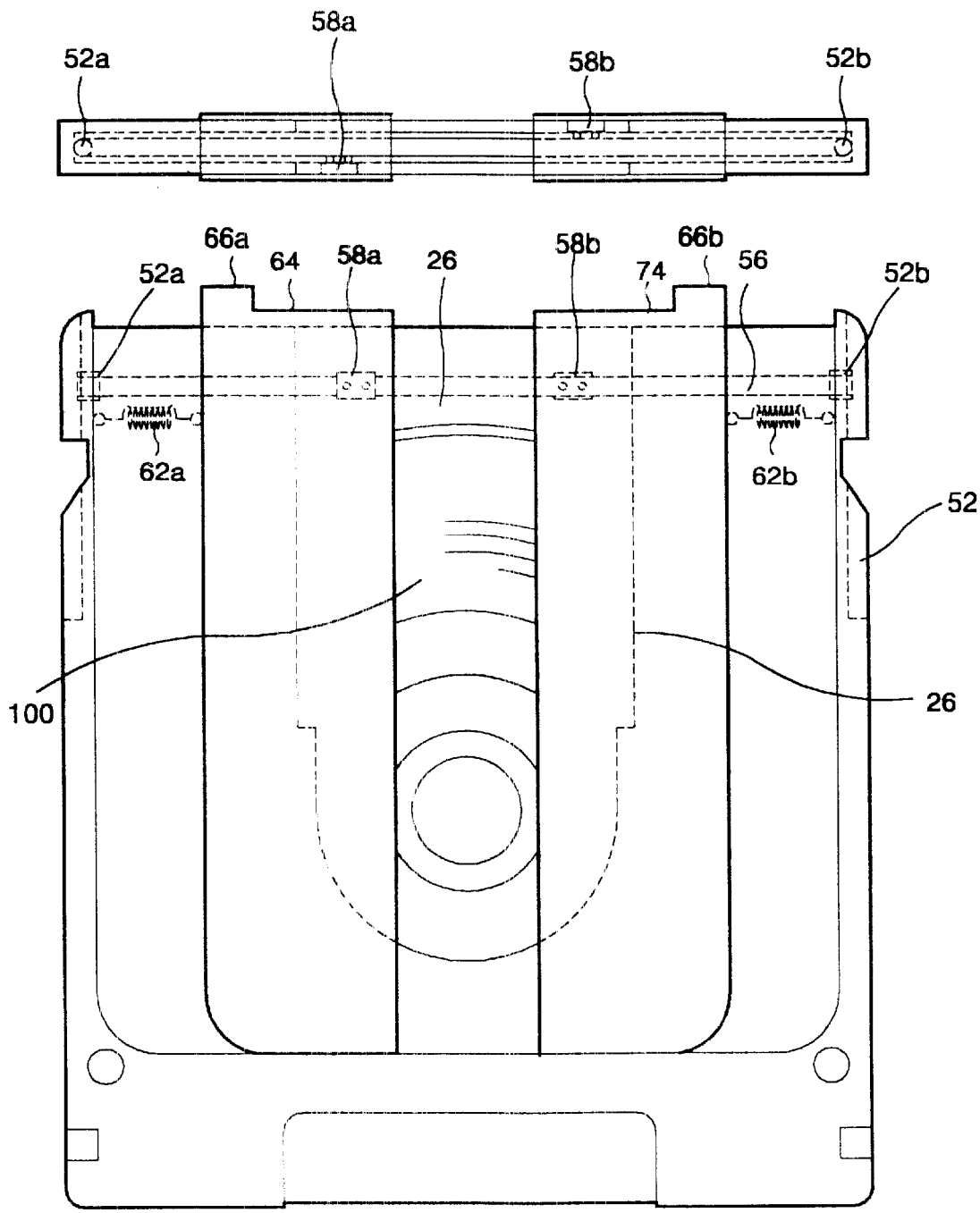
FIG. 13 is a view for representing a state in which a shutter head is attached at the disc cartridge shown in FIG. 10.

As shown in FIG. 13, the disc cartridge in FIG. 10 can have shutter heads 66*a* and 66*b* defined at each of the first and second shutters 64 and 74. In this case, the disc driver allows the shutter opener to drive the first and second shutters 64 and 74 using any one of the shutter heads 66*a* and 66*b*.

Figure 14:
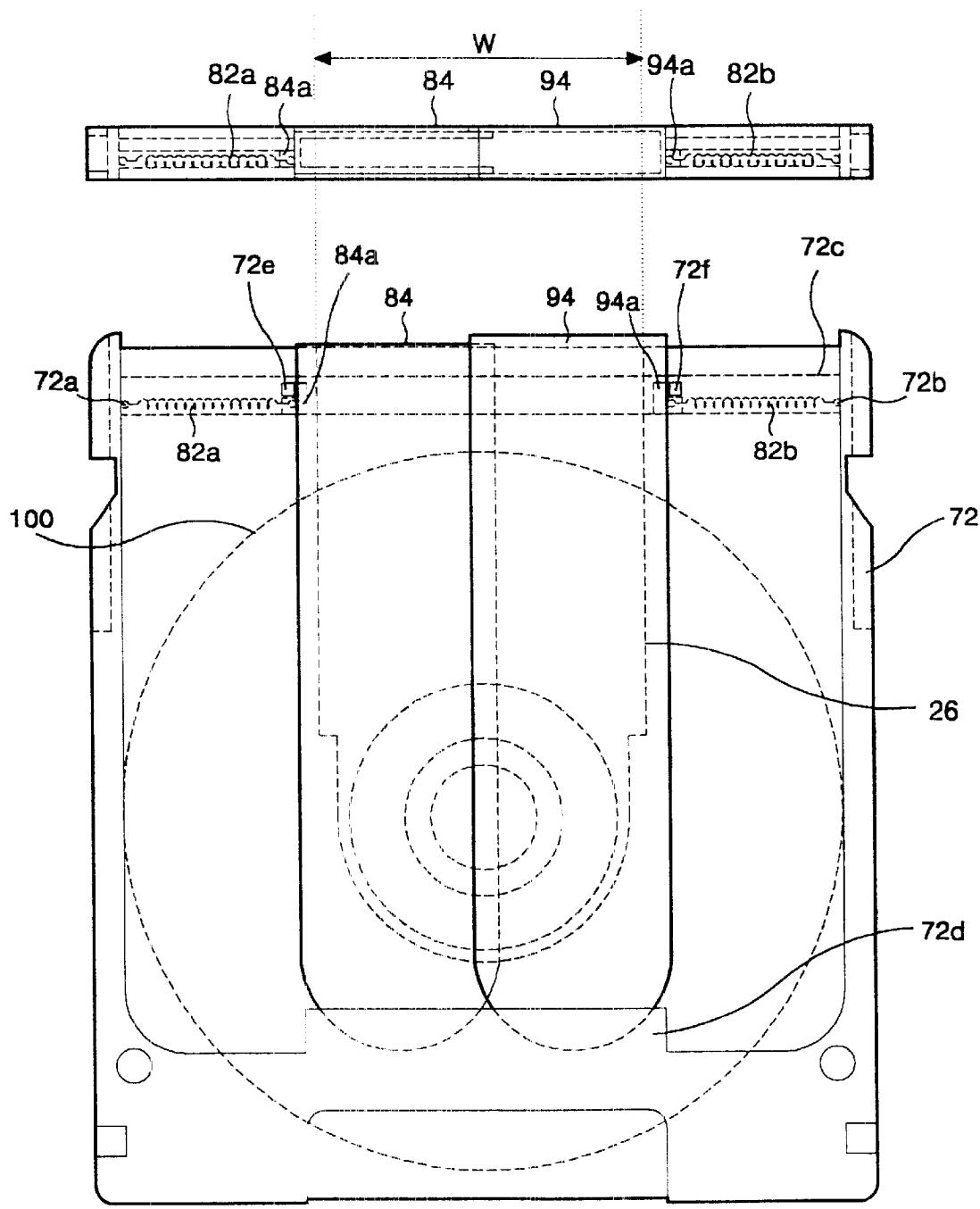
FIG. 14 is a view showing the configuration of a disc cartridge with a gearing shutter according to the fourth embodiment of the present invention.
Figure 15A:
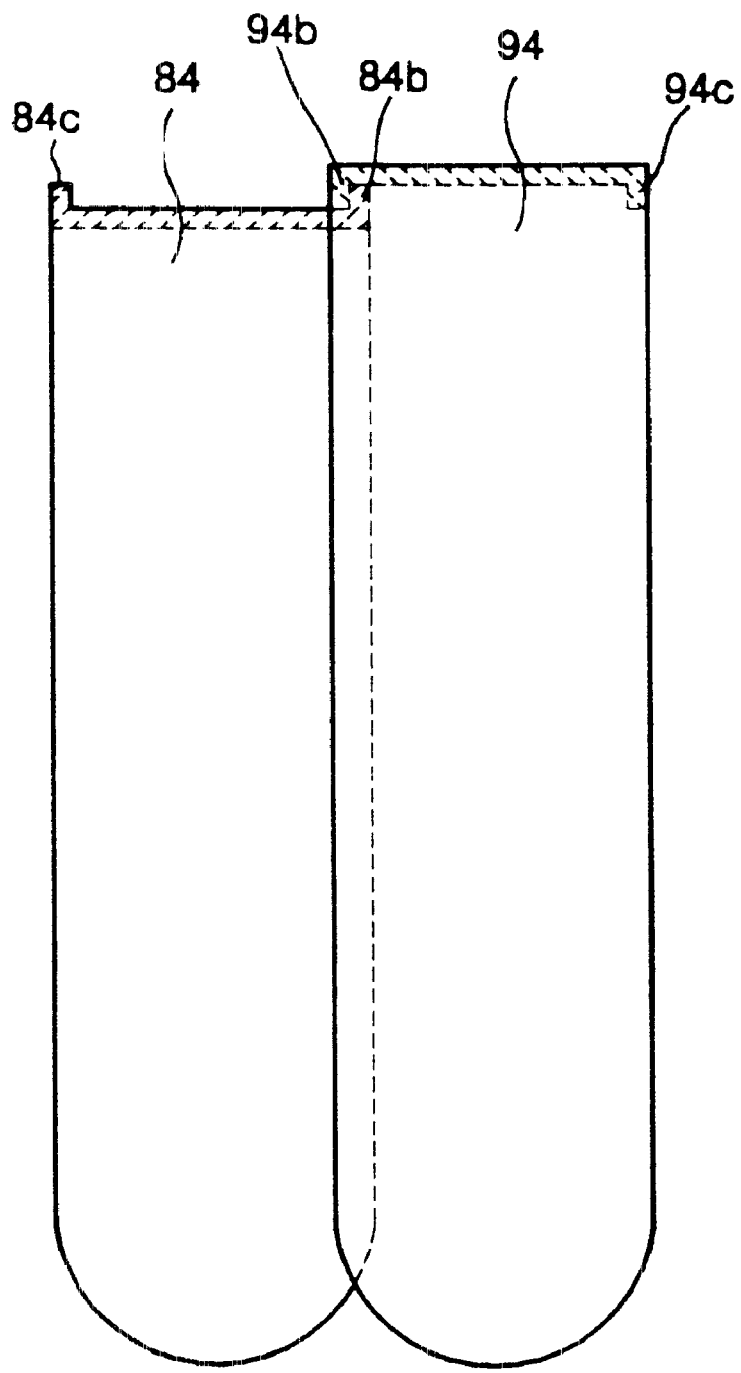
FIG. 15A is a detailed view of stoppers of the shutters in the disc cartridge shown in FIG. 14.
Figure 15B:
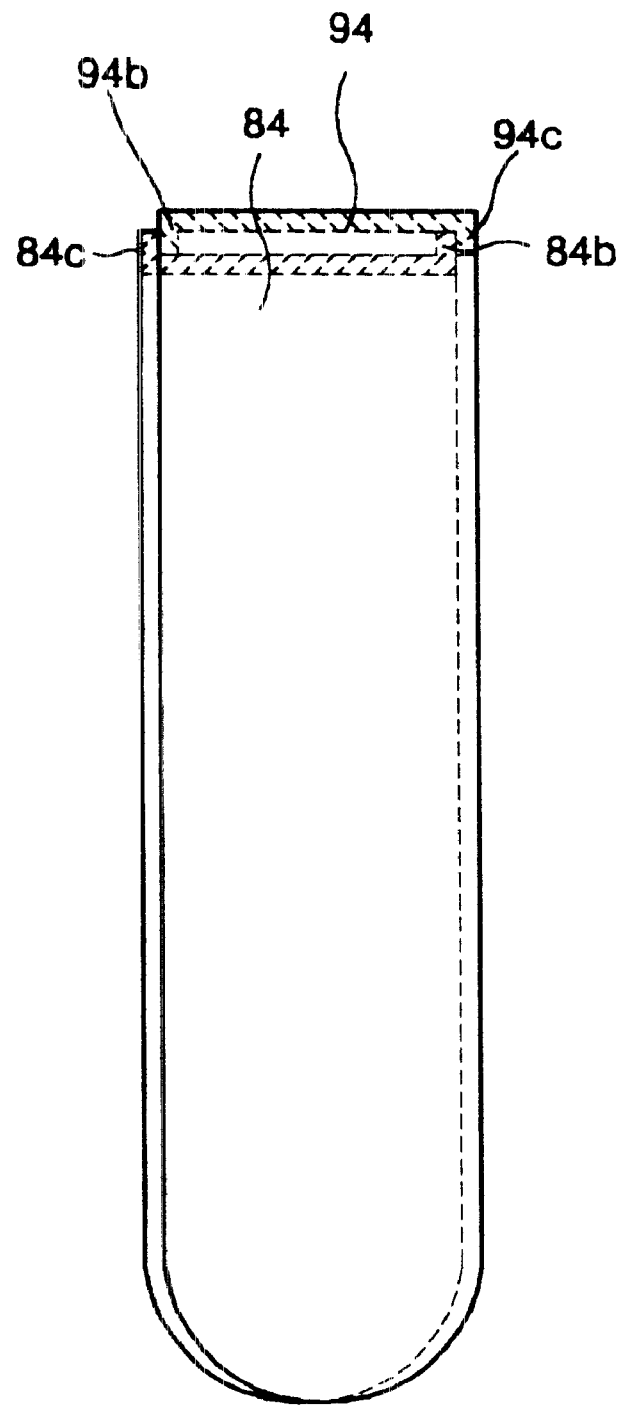
FIG. 15B is a detailed view of the stoppers when the shutters are is completely overlapped in the disc cartridge shown in FIG. 14.

Referring to FIG. 14, there is shown a disc cartridge according to the fourth embodiment of the present invention. The disc cartridge includes a body 72 defined with an opening 26, first and second shutters 84 and 94 installed linear-movably at the body 72 to open and close the opening 26 in an overlapped pattern, and first and second tension springs 82*a* and 82*b* for applying a restoring force to the first and second shutters 64 and 74. A small-size optical disc 100 is rotatably received within the body 72. The opening 26 defined at the body 72 has an opening width W equal to that of the large-disc cartridge. A shutter holder 72*d* for supporting the lower ends of the first and second shutters 84 and 94 is provided on the front surface and the rear surface of the body 72. The first and second shutters 84 and 94 are provided with stoppers 84*b*, 84*c*, 94*b* and 94*d* shown in FIG. 15A and FIG. 15B in such a manner that any one shutter 84 or 94 is linearly moved by the shutter width and thereafter the other shutter 94 or 84 is linearly moved in the same direction. The stoppers 84*b* and 84*c* defined at the first shutter 84 are protruded upwardly from the left and right top ends of the first shutter 84 while the stoppers 94*b* and 94*c* defined at the second shutter 94 are protruded downward from the left and right top ends thereof. The stoppers 84*b* and 94*b* positioned at the adjoined side of the first and second shutters 84 and 94 in the stoppers 84*b*, 84*c*, 94*b* and 94*c* is contacted and bound each other when the opening 26 has been closed. The first and second tension springs 82*a* and 82*b* have one sides secured to spring locking protrusions 72*a* and 72*b* defined at the upper left and right ends within the body 72 and the other sides secured to any one of first and second sliders 84*a* and 84*b*. The first and second sliders 84*a* and 84*b* are linear-movably inserted to a guide hole 72*c* defined in the width direction of the body 72. The first and second sliders 84*a* and 84*b* are tensioned along the shutter 94 or 84 linked to the driven shutter 84 or 94. Also, in the first and second sliders 84*a* and 94*a*, a compression is restricted at the linear motion region by means of stoppers 72*e* and 72*f* defined within the body 72.

Figure 16A:
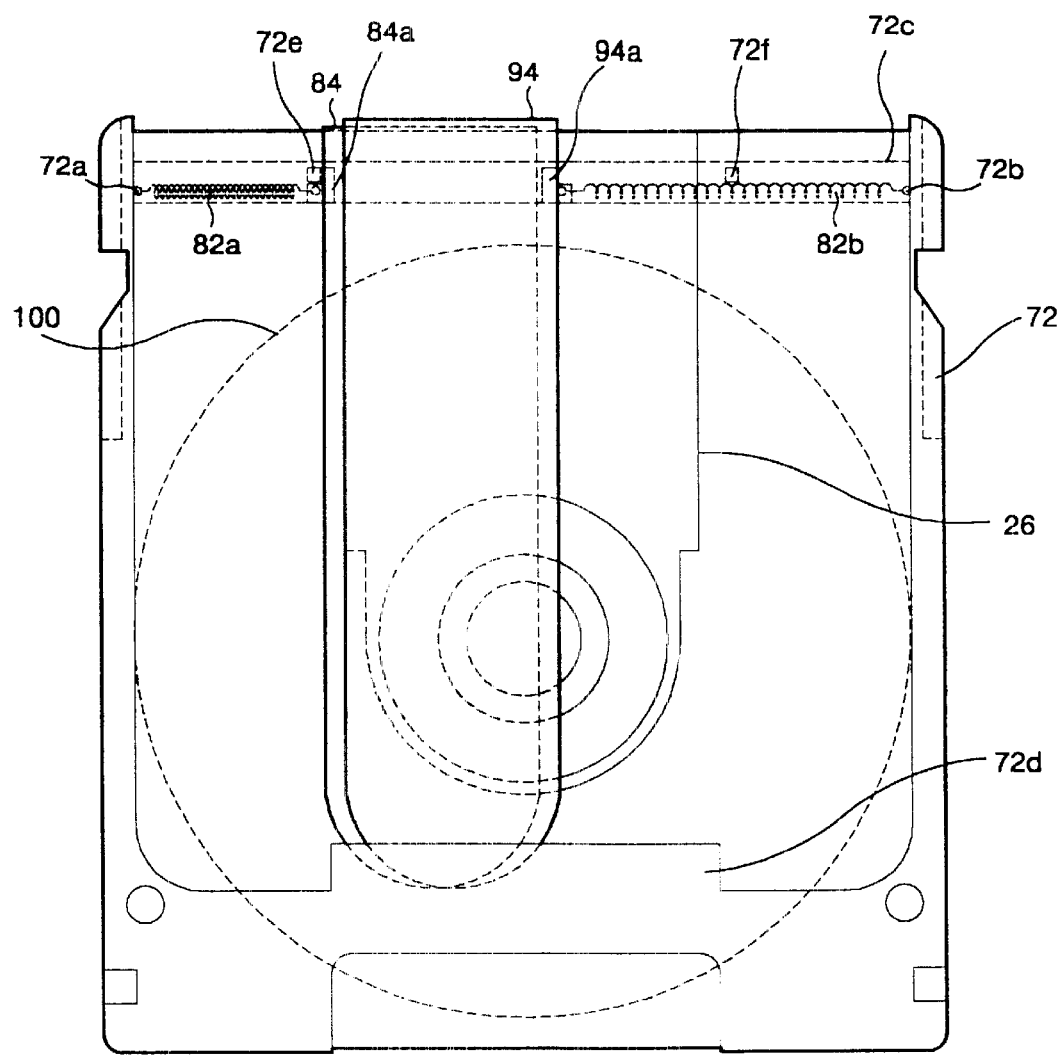
FIG. 16A is a view for representing an initial operation when the disc cartridge in FIG. 14 undergoes a driving force.
Figure 16B:
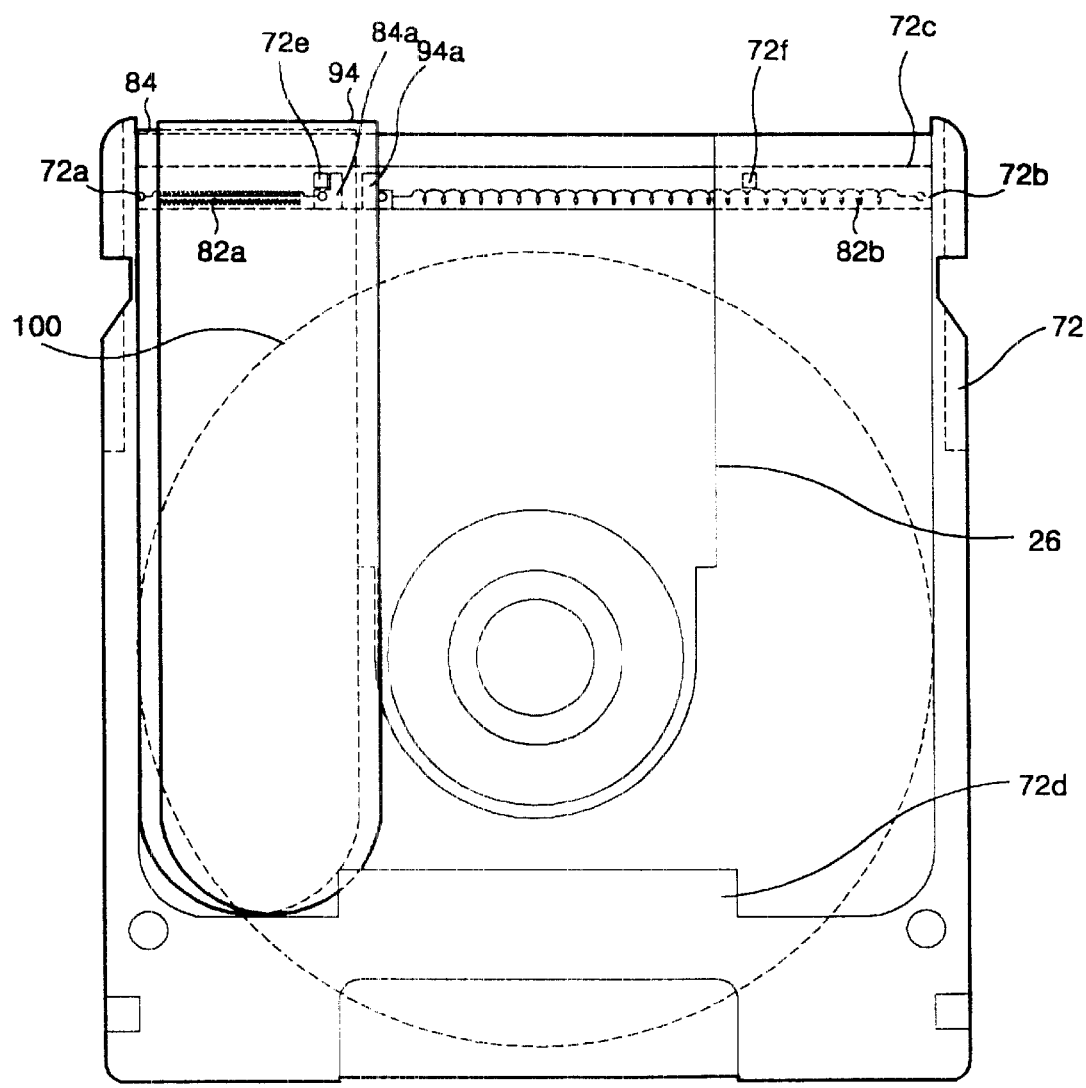
FIG. 16B is a view for representing a state in which the disc cartridge in FIG. 14 undergoes a driving force to open the opening.

If the disc cartridge is loaded into the disc driver in a state in which the opening 26 is closed as shown in FIG. 14, then the first and second shutters 84 and 94 are overlapped and, simultaneously, the opening 26 is opened as shown in FIG. 16A and FIG. 16B.

Referring now to FIG. 16A and FIG. 16B, when the disc cartridge begins to be inserted into the disc driver, the second shutter 94 undergoes a force to the left by the shutter opener. The second slider 94*a* is linearly moved to the left along with the second shutter 94, and the second tension spring 82*b* begins to be tensioned along the second slider 94*a*. The first shutter 84 is linearly moved to the left along the second shutter 94 from the moment that the left and right stoppers 84*b* and 84*c* of the first shutter 84 contact the left and right stoppers 94*b* and 94*c* of the second shutter 94 as shown in FIG. 14B. When the first and second shutters 84 and 94 is stuck fast to the left side of the body 72, the opening 26 is completely opened. At this time, the opening 26 has a width W equal to the opening of a large-size disc cartridge. The operation in which the disc cartridge is ejected within the disc driver, is carried out in a reverse sequence of the above-mentioned loading operation. In other words, the second shutter 94 is linearly moved by the shutter width to the right by a restoring force of the second tension spring 82*b* while being free from the binding of the shutter opener, and thereafter the first and second shutters 84 and 94 are moved in an overlapped state to thereby close the opening 26.

The disc cartridge with gearing shutters according to the present invention obtains the opening in the same manner as the conventional large-size disc cartridge, so that it can assure sufficient access space and clamping space. As described above, when the small-size disc cartridge has a geared shutter structure, the width of the opening thereof becomes equal to that of the large-size disc cartridge, so that small-size and large-size disc cartridges can be changeably driven without changing the structure of the optical pickup, the spindle motor and the clamper, etc. in the disc driver.

Figure 1:
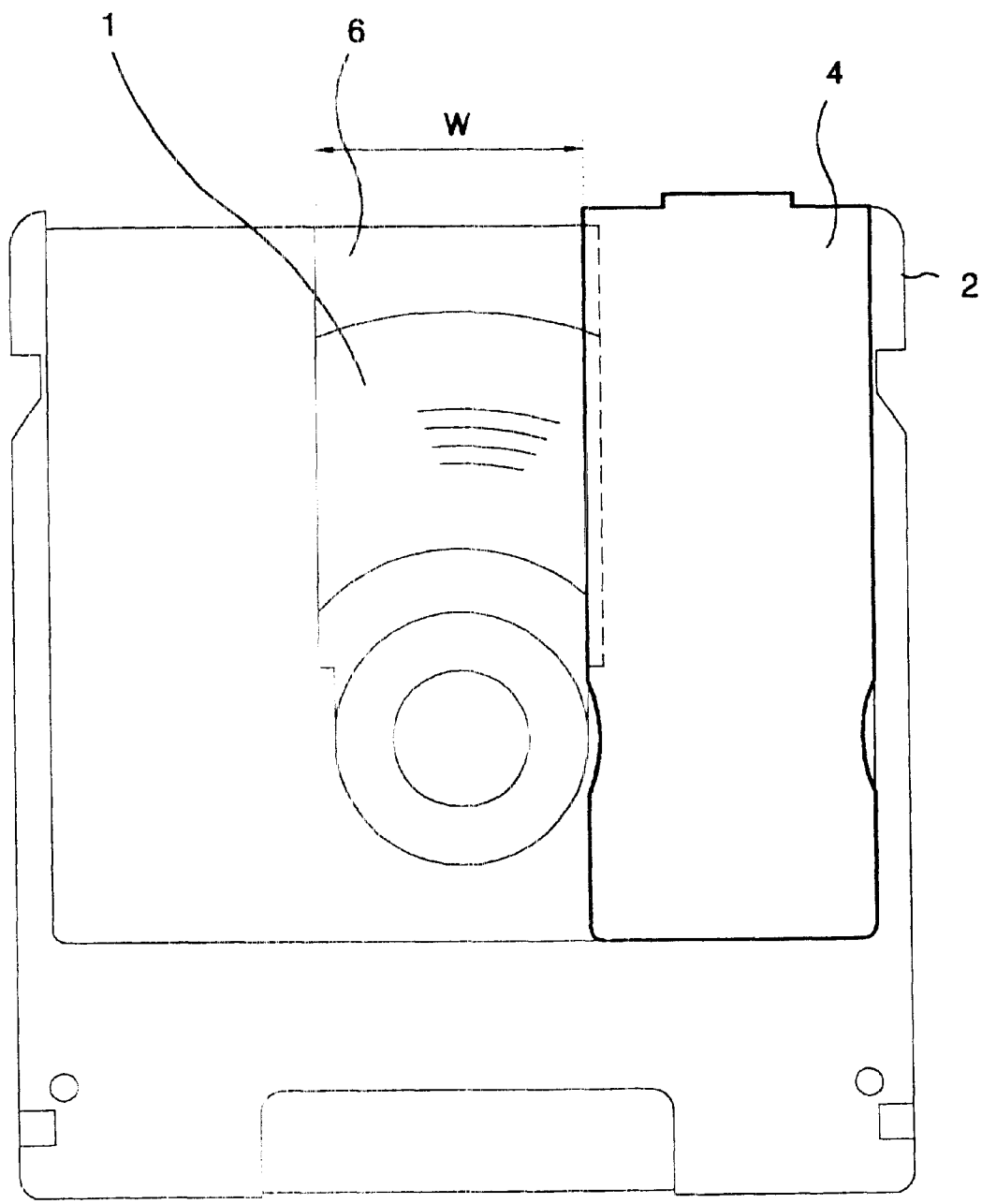
FIG. 1 is a schematic plan views showing the structure of a conventional disc cartridge.

Referring now to FIG. 17, a disc driver according to the present invention includes a tray 202 for receiving and linearly moving a large-size disc cartridge 104 and an adapter 106. The tray 202 is linearly moved toward the interior and exterior of the disc driver by a driving of a loading mechanism, not shown, within the disc driver. A receiver 202a for receiving the large-size disc cartridge 104 or the adapter 106 is defined in a shape of concave recess at the tray 202. An opening 203 having the same width W as an opening of a large-size disc cartridge is formed at the receiver 202a of the tray 202. Such a tray 202 is responsible for loading the large-size disc cartridge 104 or the adapter 106 into the interior of the disc driver 200 or ejecting the same into the exterior of the disc driver 200. The large-size disc cartridge. 104 has substantially the same structure as that shown in FIG. 1, and has an opening width W as mentioned earlier. The adapter 106 has the same width and length as the large-size disc cartridge 104, and a receiving hole 108 for receiving the small-size disc cartridge is formed at the interior of the adapter 106. Also, the adapter 106 has a shutter head 110 installed linear-movably. The small-size disc cartridge 102 is provided with geared shutters 124 and 126, and an opening having the same width as the opening of the large-size disc cartridge. The small-size disc cartridge 102 further includes a shutter head. When any one of the shutters 124 and 126 is driven, the other shutter is geared simultaneously or sequentially to close the opening of the small-size disc cartridge.

The disc cartridge with gearing shutters according to the present invention is applicable to an optical disc having a double recording face in the embodiments as well as an optical disc having a single recording face. When the optical disc with a single recording face is received, the opening of the disc cartridge having gearing shutters may be formed only at the single face.

The small-size disc cartridge having gearing shutters can be used as a support recording medium of a small-sized information communication equipment such as a digital camera, a camcoder and a portable computer, etc. In this case, it is possible to carry out data edition and correction, etc. freely at a cradle information equipment such as PC after recording a picture information or a character information on the small-size disc cartridge with the shutters geared at the small-sized information communication equipment.

As described above, the disc cartridge with gearing shutters according to the present invention is not only adaptive for a small-size optical disc, but also it assures a sufficient opening size so that it is compatible with the large-size disc cartridge. Furthermore, the disc driver according to the present invention is capable of driving the small-size disc cartridge with the gearing shutters like the large-size disc cartridge.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A disc cartridge with gearing shutters including a body in which an opening is formed and an optical disc is received, comprising:
    first and second shutter members, formed on an exterior of the body, for opening and closing the opening; and
    a connecting mechanism for linking the first and second shutter members and driving one of the first and second shutter members, as the other shutter member is driven,
    wherein when one of the first and second shutter members is driven, the connecting mechanism moves the other shutter member in a direction contrary to the driven shutter member, and
    wherein the connecting mechanism comprises:
        a pinion installed rotatably within the body;
        a first linear rack toothed into the pinion and coupled with the first shutter member; and
        a second linear rack toothed into the pinion in such a manner to be symmetrical to the first linear rack and having one side coupled with the second shutter member.

2. The disc cartridge as claimed in claim 1, wherein the connecting means further comprises:
    a spring member for applying a restoring force to the first and second shutter members.

3. The disc cartridge as claimed in claim 1, further comprising:
    a shutter head for transferring a driving force to the first and second shutter members.

4. The disc cartridge as claimed in claim 3, wherein the shutter head is provided at each of the first and second shutter members.

5. The disc cartridge as claimed in claim 3, wherein the shutter head is linear-movably installed within the body to transfer a driving force from the exterior thereof into one of the first and second shutter members.

6. A disc cartridge with gearing shutters including a body in which an opening is formed and an optical disc is received, comprising:
    first and second shutter members, formed on an exterior of the body, for opening and closing the opening; and
    a connecting mechanism for linking the first and second shutter members and driving one of the first and second shutter members, as the other shutter member is driven,
    wherein when one of the first and second shutter members is driven, the connecting means moves the other shutter member in a direction contrary to the driven shutter member, and
    wherein the connecting mechanism comprises:
        a pinion installed rotatably within the body;
        a first linear rack toothed into the pinion to move one of the first and second shutter members when one of the first and second shutter members is driven; and
        a second linear rack toothed into the pinion in such a manner to be symmetrical to the first linear rack to thereby move other shutter member rather than the shutter member moved by the first linear rack.

7. A disc cartridge with gearing shutters including a body in which an opening is formed and an optical disc is received, comprising:
    first and second shutter members, formed on an exterior of the body, for opening and closing the opening; and
    a connecting mechanism for linking the first and second shutter members and driving one of the first and second shutter members, as the other shutter member is driven,
    wherein when one of the first and second shutter members is driven, the connecting means moves the other shutter member in a direction contrary to the driven shutter member, and
    wherein the connecting mechanism comprises:
        a belt member installed in an infinite track shape within the body and coupled in such a manner that the first and second shutter members are moved in a direction contrary to each other.

8. A disc cartridge with gearing shutters incluiding a body in which an opening is formed and an optical disc is received, comprising:

first and second shutter members, formed on an exterior of the body, for opening and closing the opening; and a connecting mechanism for linking the first and second shutter members and driving one of the first and second shutter members, as the other shutter is driven, wherein the connecting mechanism moves the first and second shutter members in an overlapped state, and wherein a thickness of the second shutter member is thicker than that of the first shutter member in such a manner that the first shutter member can be inserted within the second shutter member.

9. A disc cartridge with gearing shutters including a body in which an opening is formed and an optical disc is received, comprising:

first and second shutter members, formed on an exterior of the body, for opening and closing the opening; and a connecting mechanism for linking the first and second shutter members and driving one of the first and second shutter members, as the other shutter member is driven, wherein the connecting mechanism moves the first and second shutter members in an overlapped state, and wherein the connecting mechanism comprises:
- a guide hole defined within the body;
- a first slider inserted linear-movably into the guide hole and bound to the first shutter member;
- a second slider inserted linear-movably into the guide hole and bound to the second shutter member;
- a first spring member installed between one end of the first slider and the body to apply a restoring force to the first slider; and
- a second spring member installed one end of the second slider and the body to apply a restoring force to the second slider.

10. The disc cartridge as claimed in claim 9, further comprising:

a stopper provided at a certain position in the guide hole to restrict movements of the first and second sliders.

11. A disc driving apparatus, comprising:

receiving means for receiving a small-size disc cartridge within which a small-size optical disc is received, the small-size disc cartridge including:

first and second shutter members, formed on an exterior of a body, for opening and closing an opening; and connecting mechanism for linking the first and second shutter members and driving one of the first and second shutter members as the other shutter is driven; and driving means for driving the small-size disc cartridge.

12. The disc driving apparatus as claimed in claim 11, wherein the receiving means comprises:

an adapter, being prepared in the same size as a large-size disc cartridge, to receive the small-size disc cartridge; and tray means for moving one of the adapter and the large-size disc cartridge into the driving means.

13. The disc driving apparatus as claimed in claim 12, wherein the adapter comprises:

a receiving space for receiving the small-size disc cartridge; and a shutter head for transferring a driving force from the driving means into one of the first and second shutters in the small-size disc cartridge.

* * * * *